D. N. FINLAYSON.
CHUCK.
APPLICATION FILED MAR. 26, 1920.
1,424,889.
Patented Aug. 8, 1922.
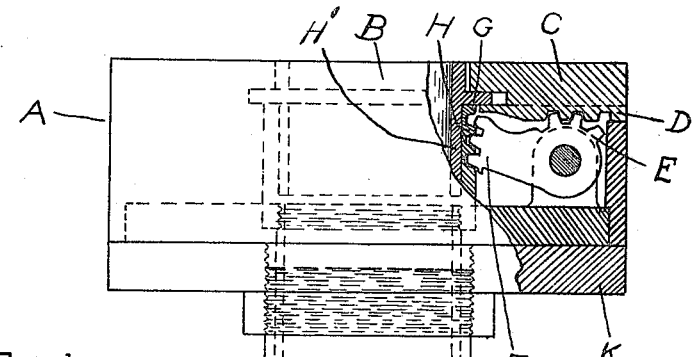
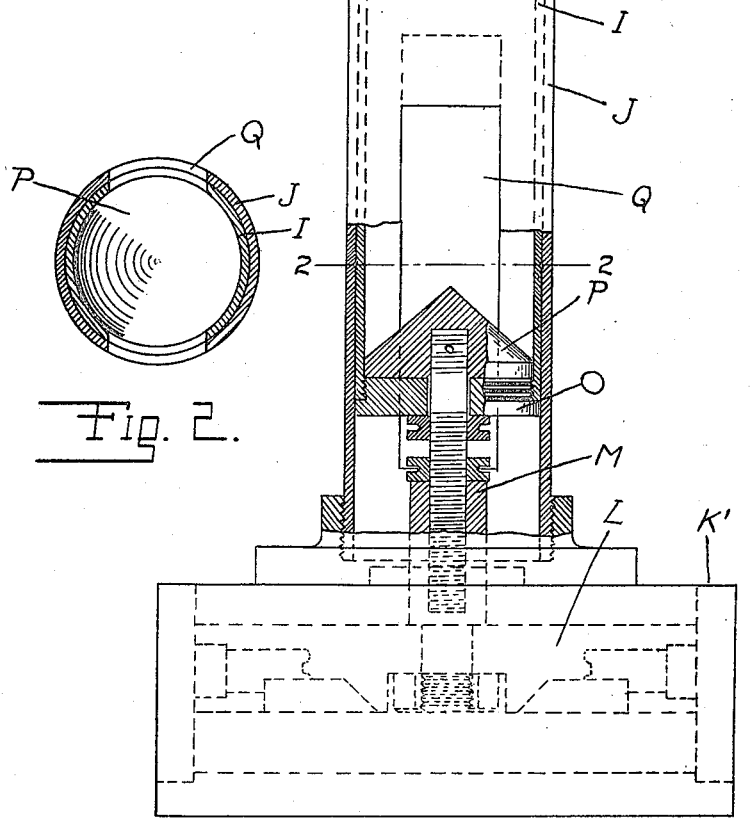
Fig. 1.
Fig. 2.
Inventor
Don N. Finlayson
By Whittemore Hulbert & Whittemore
Attorneys

UNITED STATES PATENT OFFICE.

DON N. FINLAYSON, OF FLAT ROCK, MICHIGAN, ASSIGNOR TO DETROIT PNEUMATIC CHUCK COMPANY, OF FLAT ROCK, MICHIGAN, A CORPORATION OF MICHIGAN.

CHUCK.

1,424,889.   Specification of Letters Patent.   Patented Aug. 8, 1922.

Application filed March 26, 1920. Serial No. 369,124.

*To all whom it may concern:*

Be it known that I, DON N. FINLAYSON, a citizen of the United States of America, residing at Flat Rock, in the county of Wayne and State of Michigan, have invented certain new and useful Improvements in Chucks, of which the following is a specification, reference being had therein to the accompanying drawings.

The invention relates to pneumatically operated chucks, particularly designed for use on drill presses and similar machines. It is the object of the invention to provide a unit in which the operating motor is rigidly attached to the chuck, but is arranged so as not to interfere with the work, and it is the further object to provide for the removal of the chips formed by the machining of the work while held in the chuck. These and other objects in view, the invention comprises the construction as hereinafter set forth.

In the drawings:

Figure 1 is a vertical central section through the chuck and operating motor;

Figure 2 is a detailed sectional view taken on the line 2—2 of Figure 1.

A is the work-holding chuck which is of a construction leaving a relatively large central opening B into which portions of the work may extend when clamped and held by the chuck. C are the clamping jaws which are operated radially by racks D actuated by gear segments E integral with gear segments F which engage racks G on a central longitudinally movable sleeve H which is reciprocable on a shield or bushing H' extending inwardly from an opening in the face of the body of the chuck. The sleeve H′ is of a diameter to provide a relatively large central recess so that in clamping the work, as for instance, a wheel hub, a portion of the blank can extend inward within the sleeve. The jaws each have an overhanging portion that extends past the outer end of the shield H′, to grip the work, this portion, not being shown, and a general construction of the jaw is disclosed fully in my copending application for chucks Serial 353,528 filed January 23rd, 1920.

To actuate the jaws of the chuck it is necessary to move the sleeve H longitudinally and by means which will not interfere with the work within the recess, or even with any portion of the work which may extend completely through the chuck and the table on which it is mounted. I have, therefore, provided an actuating mechanism of the following construction:

I is a tubular member secured at its upper end to the sleeve H by suitable means, such as a threaded engagement therewith. It is so disposed that the inner end is as close to the bushing or shield H′ as possible to still permit its reciprocation so that it in effect is an unbroken continuation of the shield. J is a tubular member of greater diameter surrounding the member I and secured at its upper end to the base K of the chuck, which latter may be mounted upon a table or other support (not shown). At the lower end of the tube J is mounted a pneumatic motor K′ including an outer cylinder and a piston L therein. This piston is connected with the inner tube I, preferably by means of the central shank M, passing through a suitable packing gland and attached at its upper end to a head O threaded or otherwise secured to the member I. The head O is preferably formed with a conical upper end P, so that any chips falling through the tubes will be deflected outward by the cone. The tubes I and J are also provided on opposite sides with cut-away portions or slots Q so that the chips which are outwardly deflected will pass through these slots and out from the tubes.

With the construction described when the device is mounted upon the table of the drill press, the tubes I and J will extend downward beneath the table and the motor K′ will be suspended from their lower ends. The motor is controlled by a suitable air valve (not shown), which alternately admits air above and below the piston L. Thus when the air is admitted above the piston, it will exert a downward pull upon the tube I, which is communicated to the sleeve H and racks G thereon, these in turn actuating the gear segments F which through the segments E move the racks D radially inward. The clamping jaws will thus engage the portion of the work opposite the same, while the hollow sleeve H and tubes I and J will provide clearance for any portion of the work, such for instance as a shaft, which is below the portion gripped by the chuck jaws. When, during the machining or drilling operations, chips are formed, these will drop downward through the tube I and upon striking the conical deflector P will be forced outward through the slots Q, the shield H' forming a complete protection against chips entering the moving parts of the chuck.

What I claim as my invention is:

1. The combination with a chuck having a central enlarged aperture extending therethrough, an annular wall extending inwardly from the chuck face, radially movable jaws and a longitudinally movable sleeve telescoping over the wall for operating said jaws, of a tube connected with said chuck and forming an extension of the central aperture therein, a motor mounted on the opposite end of said tube, an inner tube connected at one end to the actuating member of said motor and at its opposite end to said longitudinally movable sleeve, and a deflector within said inner tube for directing the chips outward through registering apertures in said inner and outer tubes.

2. The combination with a chuck having an annular wall extending inwardly from the face of the chuck and radially movable jaws, of a longitudinally movable sleeve telescoping over the wall for operating said jaws, a tube rigidly connected to said chuck forming an extension of the wall bore, a motor mounted at the opposite end of said tube, an inner tube connected at one end to the actuating member of said motor and at its opposite end to said longitudinally movable sleeve, and a conical head within said inner tube, said tubes being slotted to provide registering apertures through which chips deflected by said conical head are forced outward therefrom.

3. The combination with a chuck having a sleeved central opening therethrough, a motor having a reciprocatory piston and a tubular member securing the chuck and motor together with opening and piston in substantially aligned relation, of a tubular connection between the piston and the chuck jaws in internal sliding engagement with the tubular member and external telescoping engagement with the sleeve of the chuck opening, the tubular connection and member having side delivery openings in register.

4. The combination with a chuck having a sleeve extending from the chuck face into an opening through the chuck, a jaw operating member telescoping over the sleeve, a motor having a reciprocable piston and a tubular member rigidly connecting the chuck and motor and housing the piston, of a tubular member sliding in the connecting member and connecting the piston and the jaw operating member and means forming the connection between the tubular member and piston adapted to deflect material entering the tubular member through side delivery openings of the tubular member and tubular connection which are in register.

In testimony whereof I affix my signature.

DON N. FINLAYSON.